(12) United States Patent
Sasaki

(10) Patent No.: US 6,911,999 B2
(45) Date of Patent: *Jun. 28, 2005

(54) CAMERA CONTROL SYSTEM

(75) Inventor: Akitomo Sasaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,829

(22) Filed: Jan. 27, 1997

(65) Prior Publication Data

US 2001/0010545 A1 Aug. 2, 2001

(30) Foreign Application Priority Data

Jan. 30, 1996 (JP) .............................................. 8-014183

(51) Int. Cl.[7] .......................... H04N 5/232; H04N 7/14
(52) U.S. Cl. ................................ 348/211.6; 348/211.3; 348/211.99; 348/14.09
(58) Field of Search .......................... 348/15, 143, 153, 348/159, 211, 213, 13, 14, 16, 705, 706, 14.05, 14.08, 14.09; H04N 7/14, 7/15

(56) References Cited

U.S. PATENT DOCUMENTS

| | | | | |
|---|---|---|---|---|
| 4,992,866 A | * | 2/1991 | Morgan ....................... | 348/705 |
| 5,446,491 A | * | 8/1995 | Shibata et al. ................. | 348/15 |
| 5,481,297 A | * | 1/1996 | Cash et al. .................... | 348/13 |
| 5,568,183 A | * | 10/1996 | Cortjens et al. ............... | 348/15 |
| 5,657,246 A | * | 8/1997 | Hogan et al. .................. | 348/15 |
| 5,737,011 A | * | 4/1998 | Lukacs ......................... | 348/15 |
| 5,745,161 A | * | 4/1998 | Ito ............................... | 348/15 |
| 5,757,418 A | * | 5/1998 | Inagaki ......................... | 348/15 |
| 5,793,367 A | | 8/1998 | Taguchi ....................... | 345/330 |
| 5,815,080 A | | 9/1998 | Taguchi ....................... | 340/635 |
| 6,137,485 A | * | 10/2000 | Kawai et al. ................ | 348/211 |
| 6,313,875 B1 | | 11/2001 | Suga et al. ................... | 348/213 |
| 6,380,972 B1 | | 4/2002 | Suga et al. ................... | 348/211 |
| 6,433,796 B1 | | 8/2002 | Taguchi ....................... | 345/753 |
| 6,680,746 B2 | * | 1/2004 | Kawai et al. ............. | 348/211.9 |

FOREIGN PATENT DOCUMENTS

| | | |
|---|---|---|
| JP | 6-153188 | 5/1994 |
| JP | 6-205409 | 7/1994 |

* cited by examiner

Primary Examiner—Aung S. Moe
Assistant Examiner—Luong T. Nguyen
(74) Attorney, Agent, or Firm—Fitzpatrick, Cella, Harper & Scinto

(57) ABSTRACT

A camera control system capable of controlling a plurality of cameras determined whether or not the camera to be controlled is controllable. The display state of an interface used for performing a camera operation is changed in accordance with a result of this determination.

39 Claims, 11 Drawing Sheets

CAMERA CONTROL SYSTEM

BACKGROUND OF THE INVENTION

FIELD OF THE INVENTION

The present invention relates to a camera control system and, more particularly, to a camera control system which can select an arbitrary one of a plurality of cameras and can remotely control the selected camera.

Conventionally, a so-called multi-location TV conference is attained by a closed system in which a video camera that operates according to predetermined specifications is set in a specific conference room and is controlled from another conference room at a remote place. However, such a system is expensive and has not become very popular.

In recent years, along with the advance of information networks, a system that allows communications by retrieving image information from a remote place into its own terminal such as a personal computer has become popular. In such system connection via a network, intercommunications among multiple points can be easily realized, and the above-mentioned TV conference becomes more realistic.

The above-mentioned system attains connections of various video cameras to the network by adopting a standardized format. However, few systems anticipate connections of video cameras that can attain panning, tilting, and the like. Furthermore, no system that can control such video cameras via a network is available.

SUMMARY OF THE INVENTION

The present invention has been made in consideration of the above situation and has as its object to provide a camera control system which can easily identify whether or not the operations such as panning, tilting, and the like of a camera, selected by a user, of a plurality of cameras connected via a network can be controlled by a single terminal.

It is another object of the present invention to provide a system which does not cause any system operation errors even when a camera, the camera operations such as panning, tilting, and the like of which cannot be controlled, is selected.

In order to achieve the above objects, an embodiment of the present invention adopts an arrangement of a camera control system that can control a plurality of cameras, comprising:
an image reception terminal apparatus comprising
determination means for determining whether or not the camera to be controlled of the plurality of cameras is controllable,
an interface for operating the camera to be controlled of the plurality of cameras, and
display control means for changing a display state of the interface in accordance with a result from the determination means; and
an image transmission terminal apparatus comprising
a camera, and
camera control means for transmitting, to the camera, a control signal for controlling the camera.

According to another aspect, an embodiment of the present invention adopts an arrangement of an image reception terminal apparatus that can control a plurality of cameras, comprising
determination means for determining whether or not the camera to be controlled of the plurality of cameras is controllable;
an interface for inputting a signal for operating the camera to be controlled of the plurality of cameras; and
display control means for changing a display state of the interface in accordance with a result from the determination means.

According to still another aspect, an embodiment of the present invention adopts an arrangement of the apparatus wherein the image transmission terminal apparatus comprises:
camera control means for transmitting a control signal for controlling the camera to the camera; and
answer means for transmitting a signal for answering to the image reception terminal apparatus with respect to the signal transmitted from the inquiry means whether or not the camera to be controlled is controllable.

According to still another aspect, an embodiment of the present invention adopts an arrangement of a storage medium which stores a program that provides a function of allowing control of a plurality of cameras, providing the processing functions of:
determining whether or not the camera to be controlled of the plurality of cameras is controllable; and
performing display control for changing a display state of an interface for operating the camera to be controlled of the plurality of cameras in accordance with a determination result.

Other objects and features of the present invention will become apparent from the following specification and the accompanying drawings.

BRIEF DESCRIPTION OF THE DRAWINGS

FIGS. 8A and 8B are views showing the formats of packets of transmission data, in which FIG. 8A shows an inquiry packet, and FIG. 8B shows an answer packet;

DESCRIPTION OF THE PREFERRED EMBODIMENTS

An embodiment of the present invention will be described hereinafter.

Figure 1:
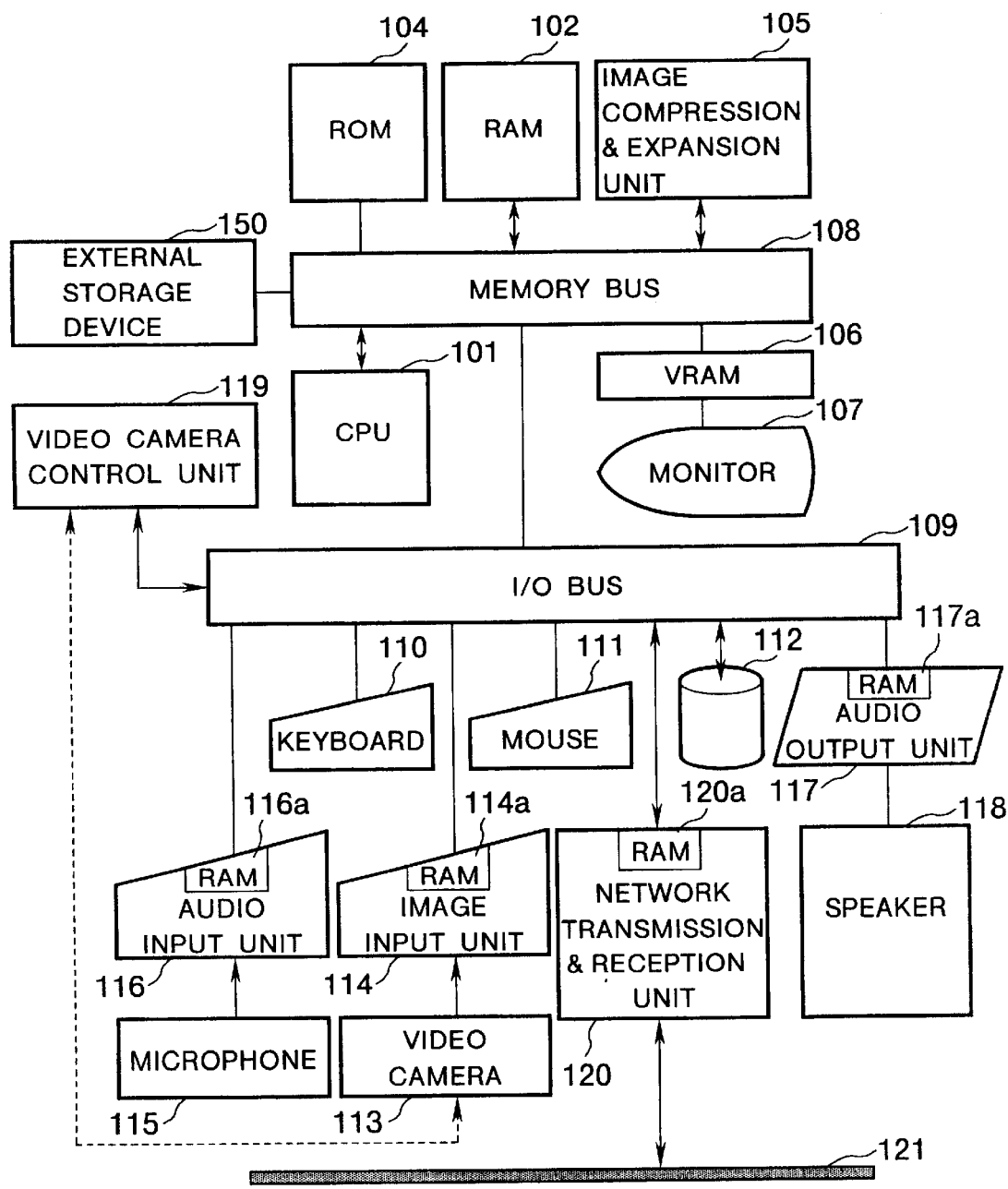
FIG. 1 is a block diagram showing an image reception terminal and an image transmission terminal, which adopt a camera control system according to the present invention.

FIG. 1 is a block diagram showing an image communication terminal according to an embodiment of the present invention. A CPU 101 controls the entire system of the image communication terminal apparatus, and a RAM 102 stores various data and provides a work area to the CPU 101. An external storage device 150 comprises, e.g., a hard disk device (HDD), a floppy disk device (FDD), a CD-ROM device, a magneto-optical disk device, or the like, and a storage medium housed in the device stores a program associated with an OS (operating system), a program associated with application software, or various programs. A ROM 104 stores a program for loading the OS program into the RAM 102, other programs, permanent data, and the like. An image compression & expansion unit 105 performs compression or expansion processing of image data, and a video memory (VRAM) 106 stores image data to be displayed on a display monitor 107. These components are connected to a memory bus 108, and can transfer data to each other.

An input/output (I/O) bus 109 is also connected to the memory bus 108. To the I/O bus 109, a keyboard 110 and a mouse 111 serving as input control terminals, an external storage device 112 such as a floppy disk device, a hard disk device, or a magneto-optical storage device, or the like, an image input unit 114 for connecting a video camera 113, an audio input unit 116 for connecting a microphone 115, an audio output unit 117 for supplying an audio signal to a speaker 118, a camera control circuit 119 for controlling panning, tilting, zooming, and the like of the video camera 113, and a network transmission & reception unit 120 connected to a network 121 are connected.

The image input unit 114 converts an analog image signal output from the video camera (to be simply referred to as a camera hereinafter) 113 into a digital signal, and stores it in its internal RAM 114a. The image signal includes a still image signal and a moving image signal. In this embodiment, still image signals are continuously stored in the RAM 114a. A moving image is treated identically as continuous still images. The audio input unit 116 also converts an analog audio signal from the microphone 115 into a digital signal and stores it in its internal RAM 116a.

The CPU 101 can access image data stored in the RAM 114a of the image input unit and audio data stored in the RAM 116a of the audio input unit 116 via the memory bus 108 and the I/O bus 109. The audio output unit 117 comprises a RAM 117a for temporarily storing audio data input from the I/O bus 109. The audio data stored in the RAM 117a is sequentially converted into an analog signal and is output to the speaker 118.

Figure 2:
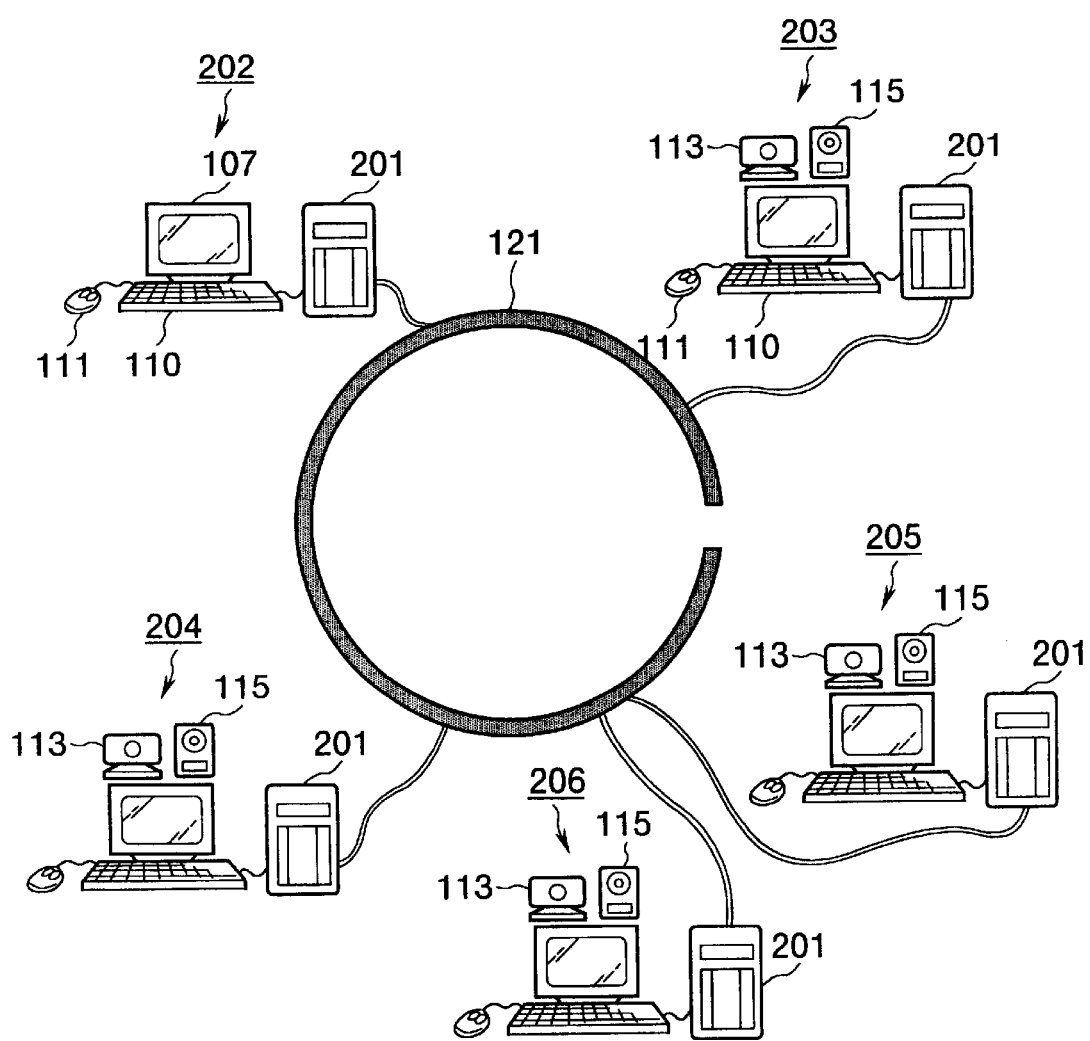
FIG. 2 is a schematic view showing a multi-point image display system that adopts the camera control system of the present invention.

As shown in FIG. 2, image communication terminal apparatuses 202, 203, 204, 205 and 206, like the image communication terminal apparatus with the arrangement shown in FIG. 1, are connected to the network 121 to build a multi-point image display system capable of audio, video, and data communications among the terminals. Note that a communication terminal main body 201 of each terminal apparatus comprises a CPU 101, RAM 102, ROM 104, image compression & expansion unit 105, VRAM 106, memory bus 108, I/O bus 109, external storage device 112, image input unit 114, audio input unit 116, audio output unit 117, camera control circuit 119, network transmission & reception unit 120, and the like, similar to those in FIG. 1.

Also, a terminal apparatus to which either a camera 113 or a microphone 115 are connected like the terminal apparatus 202 can be connected to the network. In this case, this terminal apparatus can be sued as an image reception terminal apparatus. In this embodiment, the terminal apparatuses 203, 204, 205, and 206 serve as image transmission terminals, and the terminal apparatus 202 serves as an image reception terminal. The image transmission terminals transmit images to the image reception terminal 202, which displays the transmitted images, thus realizing a multi-point image display system. As can be seen from the following description, the terminal apparatuses 203, 204, 205, and 206 that serve as the image transmission terminals can also serve as image reception terminals although a detailed description thereof will be omitted in this embodiment.

In this embodiment, the network 121 comprises a bus type network such as an Ethernet (trademark). However, the present invention is not limited to this specific type of network.

Figure 3:
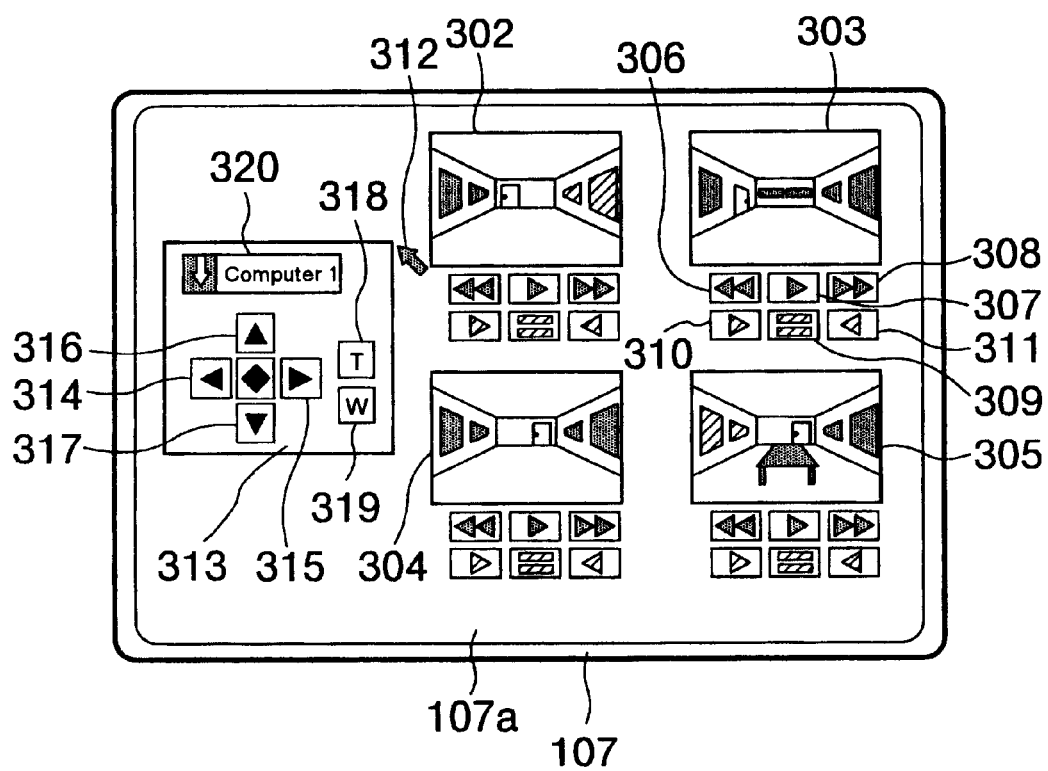
FIG. 3 is a view showing an image display example on a monitor of the image reception terminal shown in FIG. 1, and showing the case wherein camera operations are allowed.

FIG. 3 is a view showing a display example on the screen of the monitor 107.

A screen 107a of the monitor 107 displays a camera operation interface 313, which comprises operation buttons 314 and 315 for controlling the image sensing direction, i.e., in the pan direction, operation buttons 316 and 317 for controlling the tilt direction, operation buttons 318 and 319 for controlling zooming (i.e., telephoto and wide-angle) of the camera 113, and a camera name display section 320 for displaying the object to be controlled. In this embodiment, the operation button 314 corresponds to a left pan button for turning the camera to the left, the operation button 315 corresponds to a right pan button for turning the camera to the right, the operation button 316 corresponds to an up tilt button for turning the camera upward, the operation button 317 corresponds to a down tilt button for turning the camera downward, the operation button 318 corresponds to a telephoto button for instructing zooming in the telephoto direction, and the operation button 319 corresponds to a wide-angle button for instructing zooming in the wide-angle direction. The camera name display section 320 displays the identification name of the video camera control unit 119 to which the camera 113 is connected.

As is well known, the user can input desired instructions to the CPU 101 by freely moving a mouse cursor 312 using the mouse 111 (FIG. 1) and performing a predetermined operation such as clicking, double-clicking, and the like on the camera operation interface 313, and various buttons 306 to 310.

Furthermore, the screen 107a displays image display windows 302, 303, 304, and 305, which normally display images respectively sensed by the cameras 113 connected to the image transmission terminal apparatuses 203, 204, 205, and 206, which make up the multi-point image display system. Since this embodiment assumes the case wherein images from the four image transmission terminal apparatuses are to be displayed, as shown in FIG. 2, the four image display windows 302, 303, 304, and 305 are provided. The number of image display windows can be appropriately changed in correspondence with the number of controllable cameras 113.

The image display windows 302, 303, 304, and 305 can also reproduce and display recorded images and the like stored in the corresponding image transmission terminal apparatuses. For this purpose, buttons for controlling reproduction (a rewind button 306, reproduction start button 307, fast-forward button 308, and reproduction stop button 309)

and a switch button 310 for switching the image to be displayed between the recorded image and the current image, are arranged beneath each of the image display windows 302, 303, 304, and 305. Also, a previous image reproduction start button 311 used for confirming the previous image is also arranged. The reference numerals of the buttons appended to only those underneath the image display window 303 should be appended to those beneath other windows, but are omitted in FIG. 3.

Note that still more image display windows can be set as long as the screen 107a of the monitor 107 can display them, and arbitrary current and recorded images can be selectively or concurrently displayed.

The basic operation of transmission of image and audio data via the network 121 in the image transmission terminal apparatus will be explained below. In the following description, assume that image and audio data are transmitted from the image transmission terminal 203 to the image reception terminal 202.

Transmission and reception of image data will be described below.

The image input unit 114 of the image transmission terminal 203 converts an analog signal output from the video camera 113 into a digital signal, and stores the digital data as image data on the RAM 114a. The CPU 101 reads the image data from the RAM 114a of the image input unit 114, and develops it onto the RAM 102 to assemble a packet of the image data. Then, the image data packet is transmitted from the image transmission terminal 203 to the image reception terminal 202 via the network 121.

Upon detecting the arrival of the packet from the network 121, the network transmission & reception unit 120 of the image reception terminal apparatus 202 stores the packet onto its internal RAM 120a (shown in FIG. 1), and informs the CPU 101 of the arrival of the packet. The CPU 101 reads out the data from the RAM 120a in the network transmission & reception unit 120, and stores it onto the RAM 102. The CPU 101 extracts image data included in the packet, and writes it at a predetermined position in the VRAM 106. For example, when the image is to be displayed on the image display window 302, the CPU 101 writes the image data at the address, corresponding to the image display window 302, of the VRAM 106. With this processing, images transmitted from the image transmission terminal apparatuses are displayed on the corresponding image display windows 302 to 305.

Transmission and reception of audio data will be described below.

In the image transmission terminal apparatus 203, the audio input unit 116 converts an audio signal input from the microphone 115 into a digital signal, and develops the digital signal onto the internal RAM 116a to store audio data. The CPU 101 reads out the audio data from the RAM 116a in the audio input unit 116, and develops it onto the RAM 102 to assemble a packet of the audio data. Then, the CPU 101 outputs the packet to the network transmission & reception unit 120. The packet is transmitted from the image transmission terminal apparatus 203 to the image reception terminal apparatus 202 via the network 121.

Upon detecting the arrival of the packet from the network 121, the network transmission & reception unit 120 of the image reception terminal 202 develops the packet onto its internal RAM 120a and informs the CPU 101 of the arrival of the packet. The CPU 101 reads out the audio data from the RAM 120a in the network transmission & reception unit 120, and writes it in the internal RAM 117a of the audio output unit 117. The audio output unit 117 converts the audio data stored in the RAM 117a into an analog signal, and outputs the analog signal to the speaker 118. With this processing, an audio signal from the image transmission terminal apparatus 203 is output to the image reception terminal apparatus 202. Likewise, an audio signal or audio signals from one or a plurality of image communication terminals 204 to 206 can be output.

The camera control operation will be described below.

The CPU 101 of the image reception terminal apparatus 202 generates a camera control command in accordance with the operation contents of the operation buttons on the camera operation interface 313 (FIG. 3) by means of the mouse 111, designates the camera 113 to be operated and the image transmission terminal apparatus to which the camera 113 is connected, assembles a packet of the camera control command, and outputs the packet from the network transmission & reception unit 120 onto the network 121.

The designated image transmission terminal fetches the packet including the camera control command from the network 121. When it is confirmed that the camera control command is included in the received packet, the packet is transferred to the camera control unit 119. The camera control unit 119 controls panning, tilting, zooming, and the like of the video camera 113 in accordance with the input camera control command. In this manner, the video camera 113 connected to another terminal apparatus can be operated via the network 121.

In this way, the user at the image reception terminal apparatus can observe images at other points while remote-controlling the video cameras connected to the image transmission terminal apparatuses.

Figure 5:
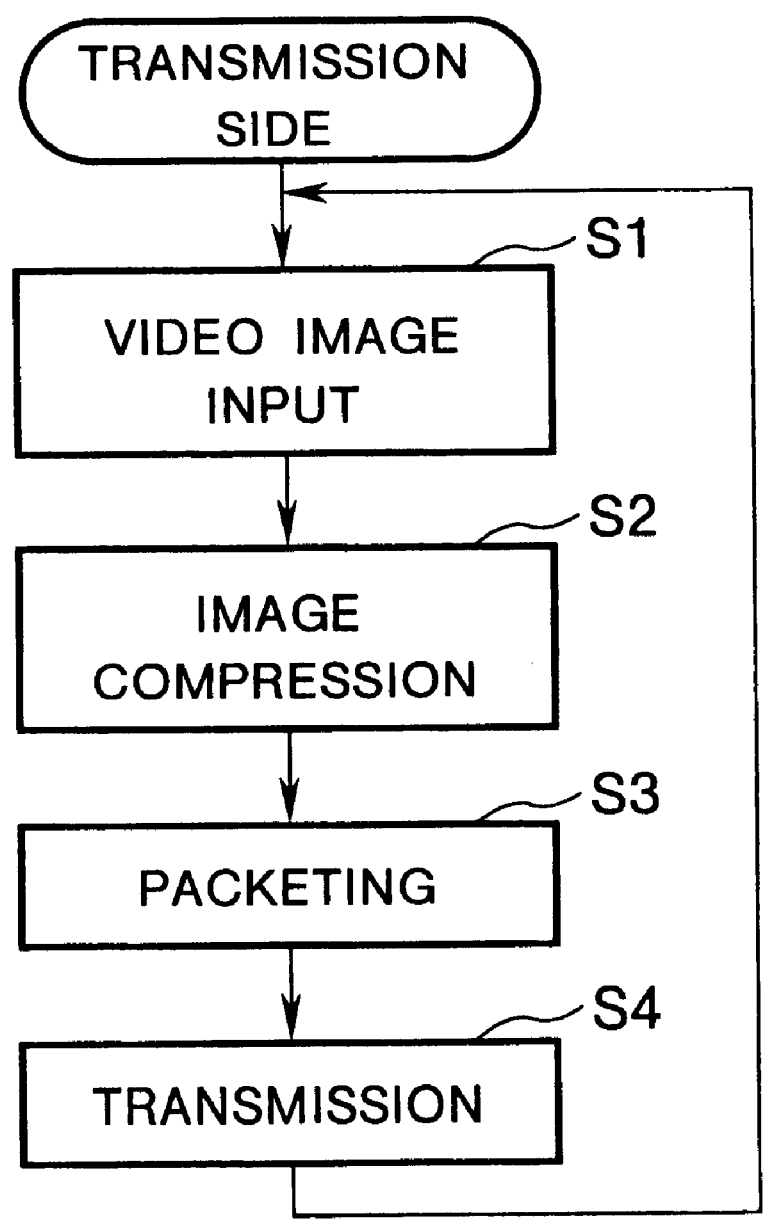
FIG. 5 is a flowchart showing the operation of the image transmitting terminal apparatus.
Figure 6:
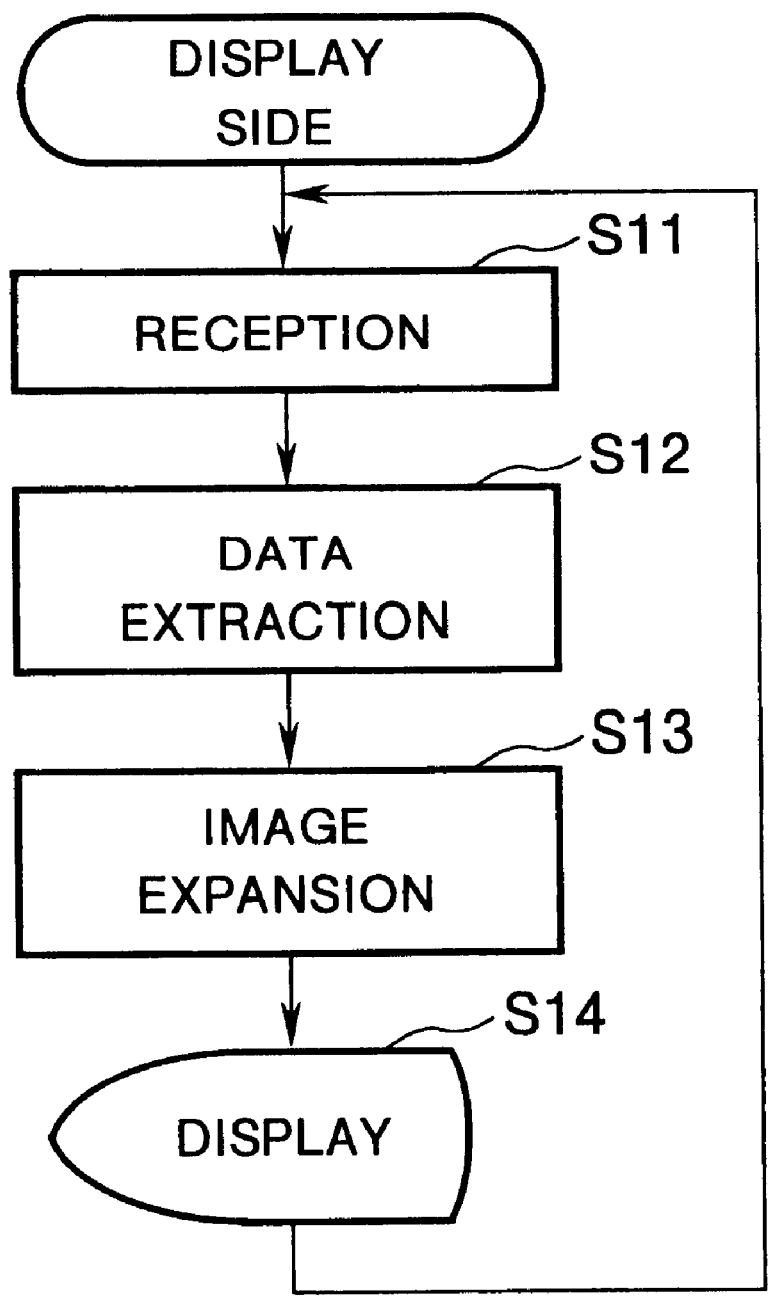
FIG. 6 is a flowchart showing the operation of the image reception terminal apparatus.

The operations of the image transmission terminal apparatus and the image reception terminal apparatus will be described below with reference to the block diagram of the apparatus shown in FIG. 1 and the flowcharts in FIGS. 5 and 6. In the following description as well, an example using the image transmission terminal apparatus 203 and the image reception terminal apparatus 202 will be explained as in the above description.

When an image is captured by a camera, image information from the video camera 113 of the image transmission terminal apparatus 203 is converted into digital data. The digital data is then stored in the RAM 114a in the image input unit 114 (S1). The CPU 101 then reads out image data from the RAM 114a in the image input unit 114 to the image compression & expansion unit 105 where the readout image data is compressed (S2). The CPU 101 segments the image data and appends a header such as an address to assemble a packet, so that the image data can be transmitted via the network 121, and stores the packet in the RAM 102 (S3). Thereafter, the CPU 101 transmits the packet (S4).

To display the captured video image, the packet transmitted from the image transmission terminal apparatus 203 flows via the network 121, and is received by the network transmission & reception unit 120 and is store in the RAM 120a in the network transmission & reception unit 120 (S11). The network transmission & reception unit 120 then generates a reception interruption to the CPU 101, and the CPU 101 reads out the packet from the RAM 120a in the network transmission & reception unit 120, extracts data from the packet by removing the header and the like, and copies the extracted data to the RAM 102 (S12). The CPU 101 repeats this processing to obtain unit data for each frame. After the data for all frames are obtained, the CPU 101 reassembles them, and expands the compressed image signal by the image compression & expansion unit 105 (S13). Then, the CPU 101 displays the expanded image on the image display window on the screen 107a of the monitor 107 (S14).

The control of the camera that fetches the image displayed on the image display window will be described below.

The camera 113 to be controlled is selected by selecting the image display window corresponding to the camera 113. For example, in FIG. 3, when the image display window 302 on the screen 107a is selected by the mouse cursor 312, the CPU 101 communicates with the terminal apparatus 203 that transmits the image displayed on the image display window 302, so as to be able to control the camera 113 included in the terminal apparatus 203.

Figure 4:
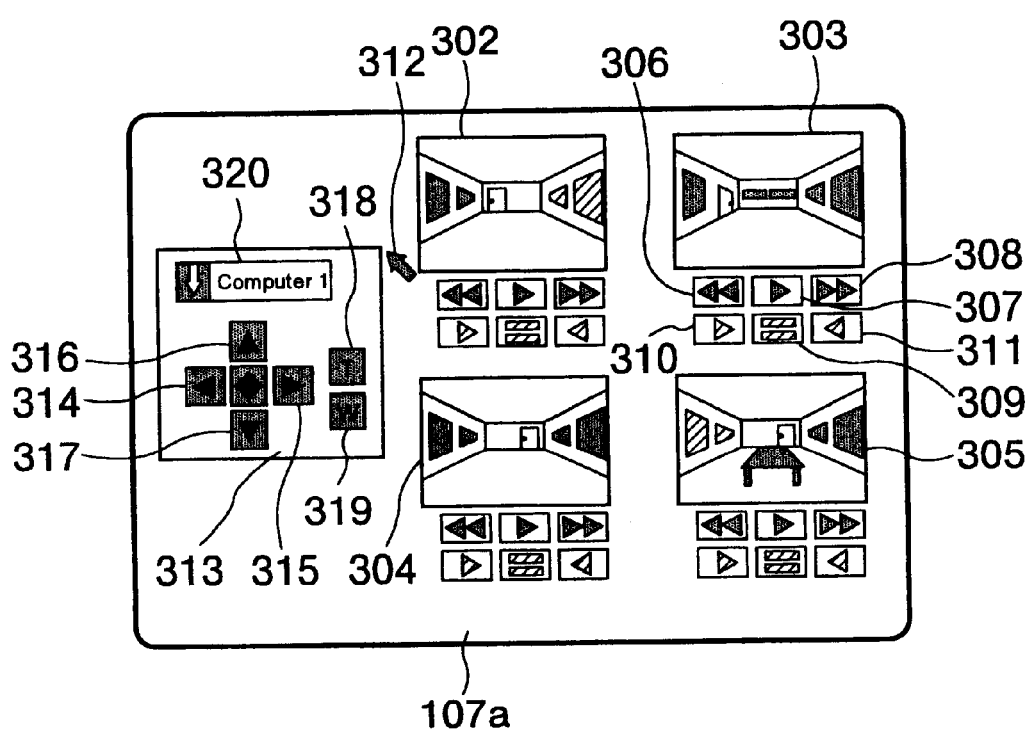
FIG. 4 is a view showing an image display example on the monitor of the image reception terminal shown in FIG. 1, and showing the case wherein camera operations are not allowed, and the color of operation buttons is changed.
Figure 7:
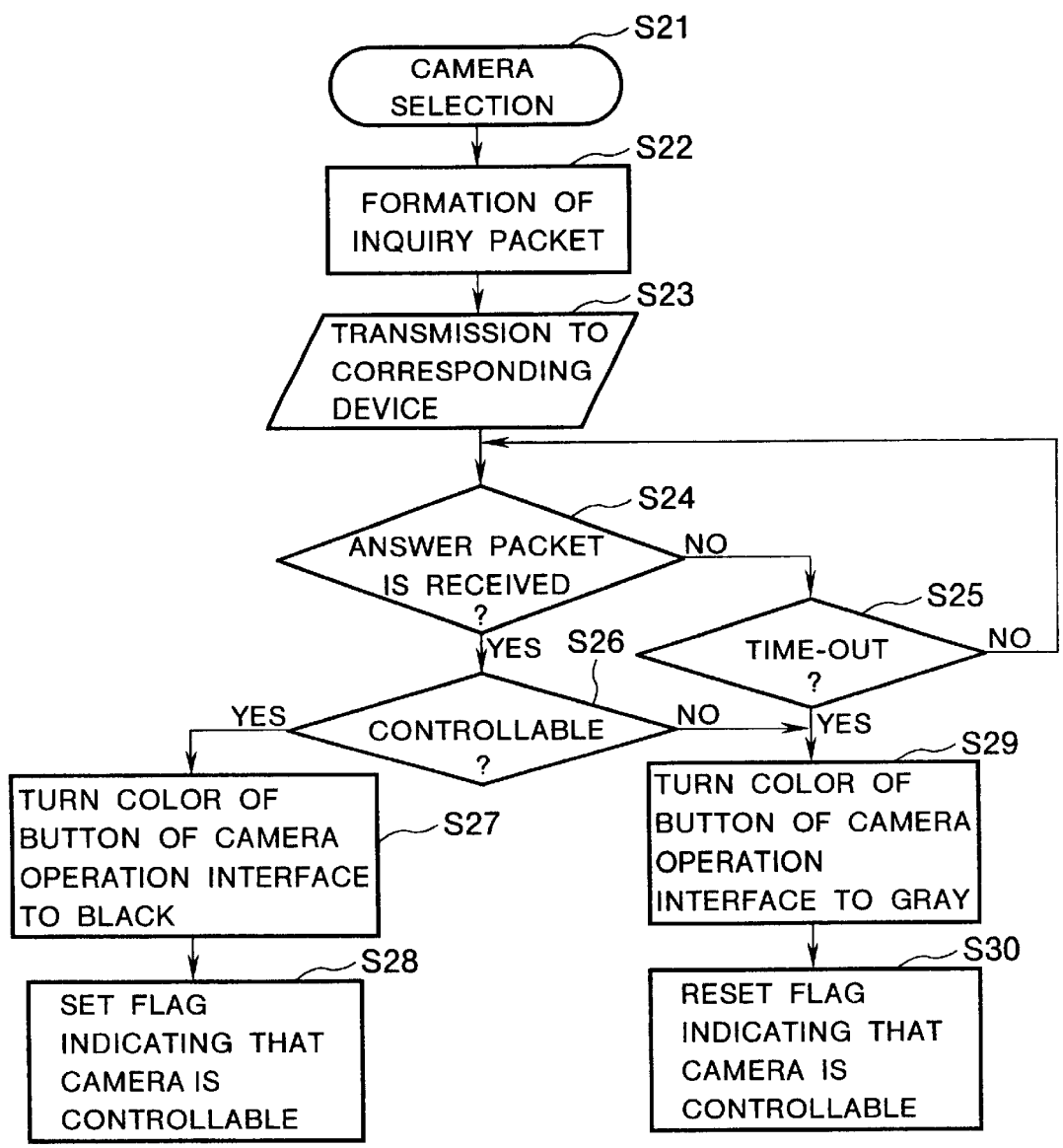
FIG. 7 is a flowchart showing the operation performed when the camera to be operated is selected.

The camera control method, including the procedure for checking whether the camera is controllable, is the most characteristic feature of the present invention and will be explained below with reference to FIGS. 3, 4, and 7.

Figure 8A:
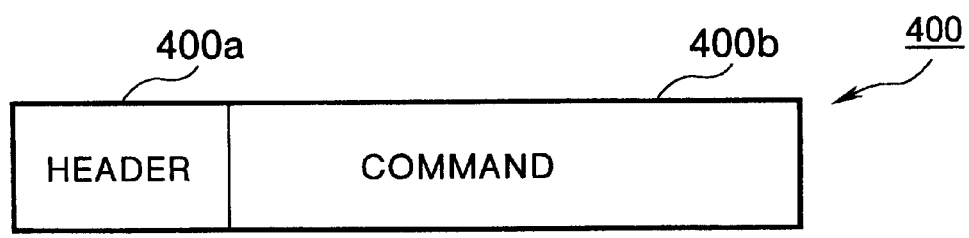

In the image reception terminal apparatus 202, when the image display window (e.g., 302) is pointed on the screen 107a and is clicked using the mouse 111 a camera 113 is selected (S21). Next, an "inquiry packet" for inquiring whether or not the camera 113 corresponding to the clicked image display window can be controlled by the video camera control unit 119 arranged in the image reception terminal apparatus 202 is formed (S22). As shown in FIG. 8A, an inquiry packet 400 includes a header 400a indicating the address of the target apparatus and an inquiry command 400b.

Figure 8B:
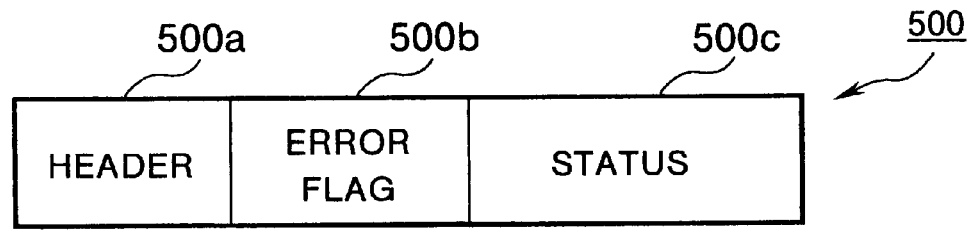

The network transmission & reception unit 120 of the image reception terminal apparatus 202 checks the network address of the communication terminal apparatus 203 that transmits the image displayed on the corresponding image display window, and transmits the inquiry packet to the image transmission terminal apparatus 203 (S23). Upon reception of the "inquiry packet", the CPU 101 of the image transmission terminal apparatus 203 forms an "answer packet" for answering whether or not the video camera 113 can be controlled by the image communication apparatus 202 as the inquiry source. The image reception terminal apparatus 202 waits for the "answer packet" to the "inquiry packet" from the image transmission terminal apparatus 203 (S24). As shown in FIG. 8B, an answer packet 500 is formed to have a header 500a indicating the apparatus to which the answer is to be sent, an error flag 500b indicating the presence/absence of errors, and status 500c indicating status with respect to the inquiry.

In the image reception terminal apparatus 202, when the network transmission & reception unit 120 does not receive any answer packet (S24) or when a predetermined period of time has passed after transmission of the inquiry packet, the network transmission & reception unit times out (S25). The CPU 101 determines that the camera cannot be controlled, and the flow advances to step S29.

When the network transmission & reception unit 120 receives an answer packet (S24), it generates an interruption to the CPU 101. When the error flag 500b in the answer packet is "0", the CPU 101 determines that the camera is controllable (S26). The CPU then turns the color of the operation buttons 314 to 319 on the camera operation interface 313 to black to indicate that the camera 113 connected to the image transmission terminal apparatus 203 is controllable (S27), as shown in FIG. 3, and sets a flag indicating that the camera 113 of interest is controllable in a predetermined area of the RAM 102 (S28).

On the other hand, when the network transmission & reception unit 120 receives an answer packet (S24), and the error flag 500b in the answer packet is "1", the CPU 101 determines that the camera 113 of interest is uncontrollable (S26). The CPU then turns the color of the operation buttons 314 to 319 on the camera operation interface to gray to indicate that the camera 113 of interest cannot be controlled by the image reception terminal apparatus 202 (S29), as shown in FIG. 4, and resets the flag indicating that the camera is controllable in the predetermined area of the RAM 102 (S30).

With the above arrangement, since the user can discriminate on the basis of the color of the operation buttons on the camera operation interface 313 whether or not the camera of interest is controllable, the operability can be greatly improved. In this embodiment, the CPU 101 and the network transmission & reception unit 120 serve as a determination means of the present invention. The CPU 101 also serves as a display control means.

According to the above arrangement, not only the case wherein the camera 113 is in the uncontrollable state (for example, when the camera 113 is not set on a tripod or the tripod is abnormal), but also the case wherein a camera requiring a different interface and application software for control is selected can be coped with, and the present invention is more effective when a large number of types of cameras are connected to the network.

Figure 9:
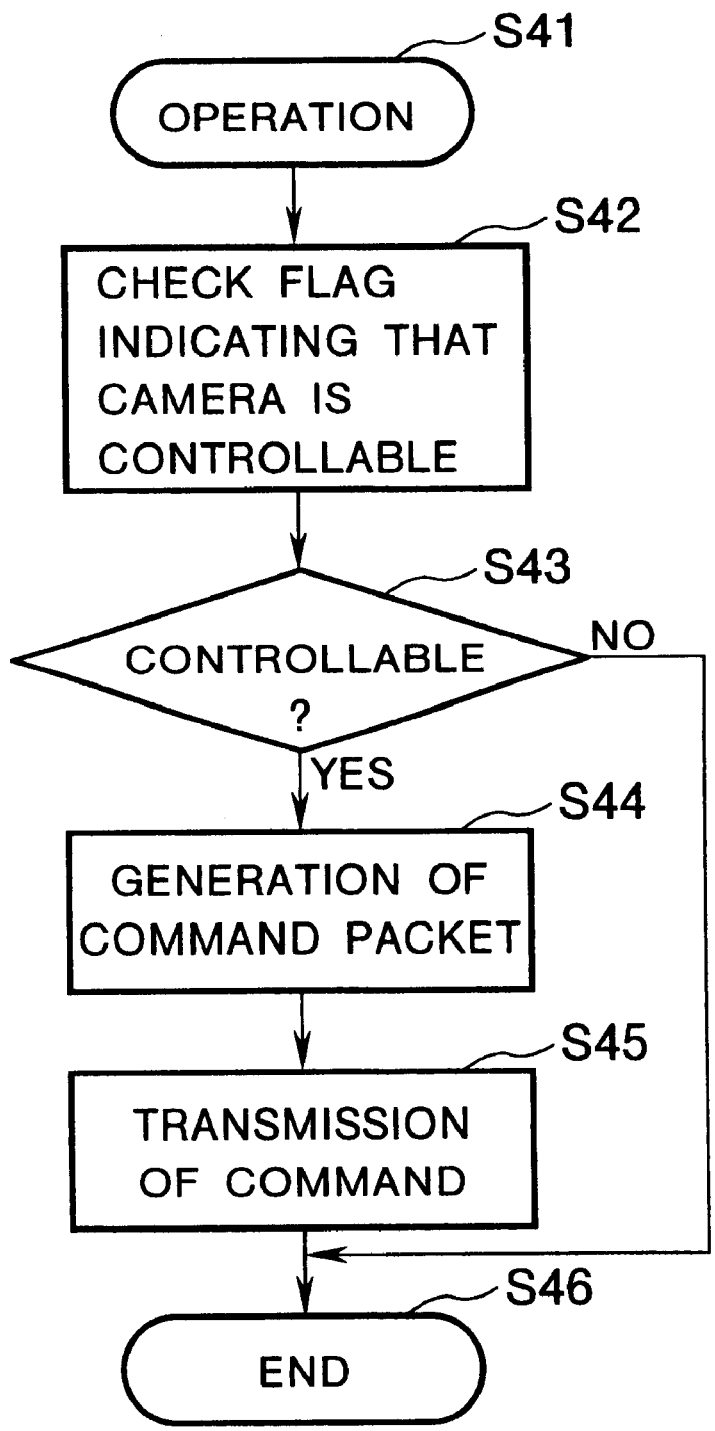
FIG. 9 is a flowchart showing the operation performed when a camera, the operation of which cannot be controlled, is operated.

The camera control operation using the camera operation interface 313 will be described below with reference to FIG. 9.

When a certain operation button on the camera operation interface 313 is pointed by the mouse cursor 312 and is clicked by the mouse 111 (S41), the CPU 101 checks the flag indicating that the camera is controllable (S42). If the flag indicating that the camera is controllable is not set (S43), the control ends without any processing (S46), and the operation buttons 314 to 319 of the camera operation interface 313 remain gray, as shown in FIG. 4.

If the flag indicating that the camera is controllable is set (S43), a command packet for performing the selected operation is generated (S44), and is transmitted to the image transmission terminal 203 as the target apparatus (S45). This command packet also has a header and a command as in the above-mentioned inquiry packet 400. Note that the CPU 101 also serves as a control means of this embodiment.

With the above arrangement, when a camera which is not controllable is selected, the camera control system of this embodiment does nothing.

In the above embodiment, whether or not the camera is controllable is indicated by changing the color of the operation buttons on the camera operation interface. However, the present invention is not limited to this specific method. For example, when a camera which is not controllable is selected, the operation buttons 314 to 319 (FIG. 3) are not displayed or are displayed as semi-transparent buttons, or the camera operation interface 313 itself is not displayed. In this way, the appearance of the camera operation interface need only be changed to be able to identify whether or not a controllable camera is selected.

Figure 10:
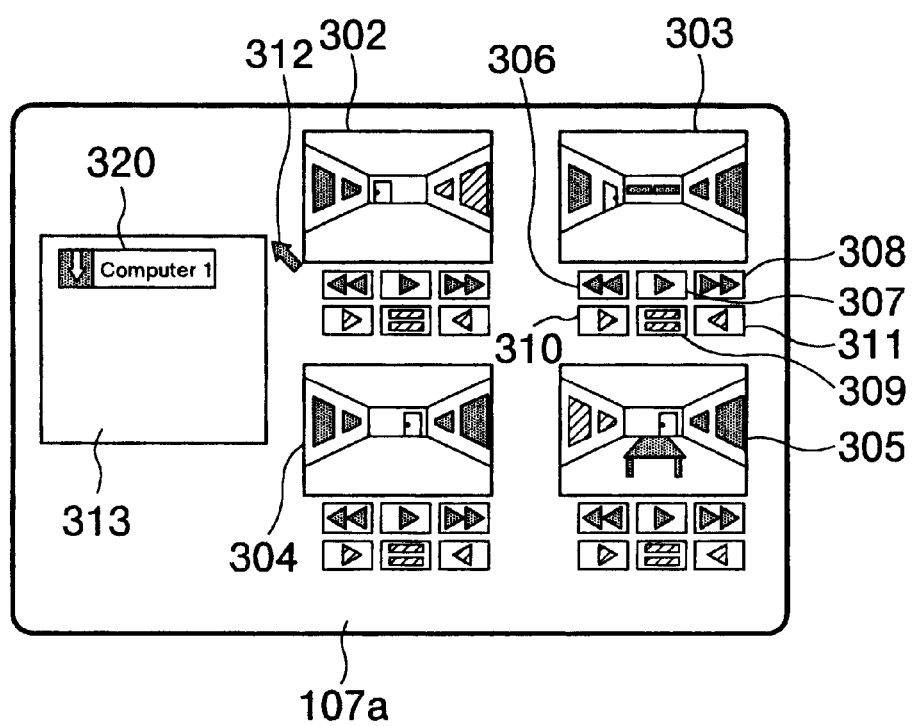
FIG. 10 is a view showing an image display example on the monitor of the image reception terminal shown in FIG. 1, and showing the case wherein camera operations are not allowed, and no operation buttons are displayed.

FIG. 10 shows the display state in which none of the operation buttons on the camera operation interface 313 on the screen 107a are displayed when an uncontrollable camera is selected.

In this case, the CPU 101 serves as a display control means which prevents the display of any operation buttons on the camera operation interface 313 in place of changing the color of the operation buttons on the camera operation interface.

Figure 11:
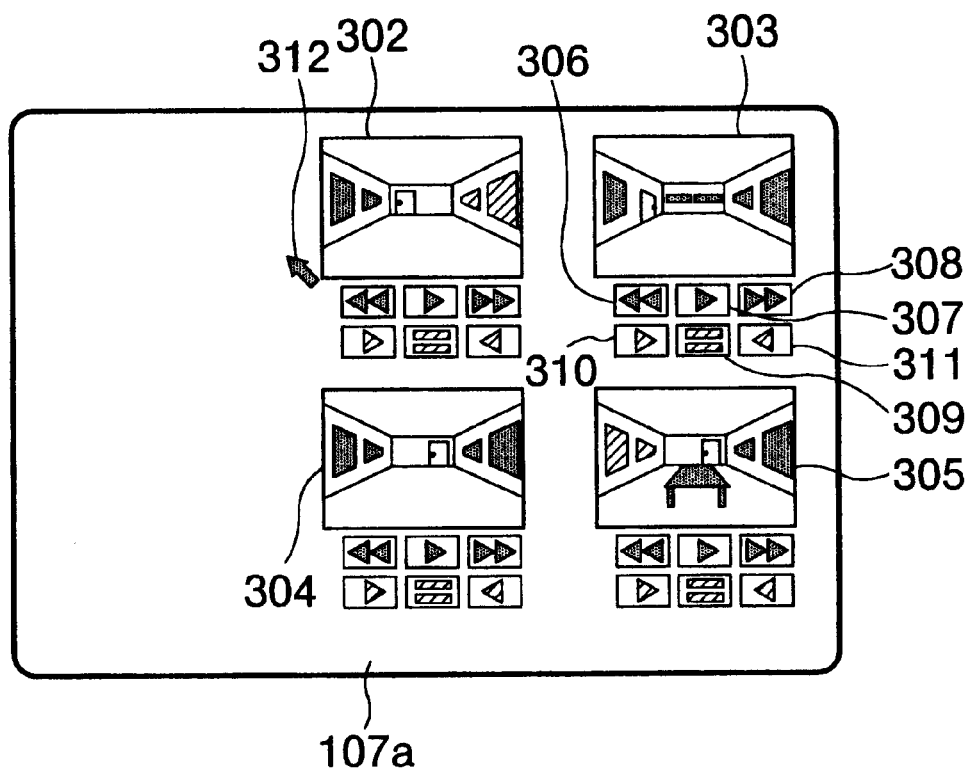
FIG. 11 is a view showing an image display example on the monitor of the image reception terminal shown in FIG. 1, and showing the case wherein camera operations are not allowed, and no camera operation interface is displayed.

FIG. 11 shows the display state in which the camera operation interface 313 itself is not displayed on the screen 107a when an uncontrollable camera is selected.

In this case, the CPU 101 serves as a display control means which prevents the display of the camera operation interface 313 on the screen 107a in place of changing the color of the operation buttons on the camera operation interface.

Note that the reference numerals in FIGS. 10 and 11 denote the same parts as those in FIG. 3, and a detailed description thereof will be omitted.

According to this embodiment, the user can be visually informed that an uncontrollable camera is selected by changing the display state of the camera interface, and can easily identify whether or not the selected camera is controllable by its own terminal.

When the result of the determination means indicates that the camera is uncontrollable, the camera operation request is ignored, and the camera control system does nothing. In this way, unnecessary operations can be prevented, and even when an uncontrollable camera is selected, no system operation errors occur.

What is claimed is:

1. A camera control system comprising:
   an image reception terminal apparatus comprising,
   a determination device constructed to receive information from an image transmission terminal apparatus of a selected camera, the information indicating whether or not the selected camera is controllable, said determination device further being constructed to determine whether or not the selected camera is controllable on the basis of the received information, and
   a display controller that displays a camera operation interface that has functions to input a control command to control the selected camera, and that changes a display state of the camera operation interface between a first display state for the selected camera corresponding to a determination that the selected camera is controllable and a second display state for the selected camera, the second display state being different from the first and corresponding to a determination that the selected camera is not controllable, and
   wherein the image transmission terminal apparatus comprises a camera and a transmission device that transmits information as to whether or not the camera is controllable.

2. A system according to claim 1, wherein said image reception terminal apparatus further comprises a controller to disable an operation of the camera operation interface when said determination device determines that the selected camera is not controllable.

3. A system according to claim 1, wherein the image reception terminal apparatus further comprises an inquiry device that transmits an inquiry signal inquiring of the image transmission terminal apparatus whether or not the selected camera is controllable.

4. A system according to claim 3, wherein the transmission device transmits a signal for answering the inquiry signal from said image reception terminal apparatus.

5. A system according to claim 4, wherein said determination device determines that the selected camera is not controllable when a signal is not received from the transmission device within predetermined period of time after the inquiry signal is transmitted from said inquiry device.

6. A system according to claim 1, wherein said display controller displays the camera operation interface on a screen.

7. A system according to claim 6, wherein said display controller displays an image display portion on the screen configured to display images input from a plurality of cameras.

8. A system according to claim 7, wherein said image reception terminal apparatus further comprises an inquiry device that transmits a signal for inquiring of the image transmission terminal apparatus whether or not the selected camera of the plurality of cameras is controllable.

9. A system according to claim 8, wherein said inquiry device transmits the inquiry signal of the image transmission terminal apparatus whether or not the selected camera is controllable by designating an image input from the selected camera of the images input from the plurality of cameras displayed on the image display portion.

10. A system according to claim 6, wherein said display controller displays the camera operation interface on the screen in different colors according to whether said determination device determines that the selected camera is controllable or uncontrollable.

11. A system according to claim 6, wherein said display controller does not display the camera operation interface on the screen when said determination device determines that the selected camera is not controllable.

12. A system according to claim 6, wherein said display controller does not display any operation buttons arranged on the camera operation interface on the screen when said determination device determines that the selected camera is not controllable.

13. A system according to claim 1, wherein at least one of panning and tilting of said selected camera is controllable on the basis of the control signal from the image transmission terminal apparatus.

14. An image reception terminal apparatus comprising:
   a determination device constructed to receive information from an image transmission terminal apparatus of a selected camera, the information indicating whether or not the selected camera is controllable, said determination device further being constructed to determine whether or not the selected camera is controllable on the basis of the received information; and
   a display controller that displays a camera operation interface that has functions to input a control command to control the selected camera, and that changes a display state of the camera operation interface between a first display state for the selected camera corresponding to a determination that the selected camera is controllable and a second display state for the selected camera, the second display state being different from the first and corresponding to determination that the selected camera is not controllable.

15. An apparatus according to claim 14, further comprising a controller that disables an operation of the camera operation interface when said determination device determines that the selected camera is controllable.

16. An apparatus according to claim 14, further comprising an inquiry device that transmits an inquiry signal for inquiring of the image transmission terminal apparatus, which can control the selected camera, whether or not the selected camera is controllable.

17. An apparatus according to claim 16, wherein said determination device determines that the selected camera is not controllable when a response is not received from the image transmission terminal apparatus within a predetermined period of time after the inquiry signal for inquiring of the image transmission terminal apparatus whether or not the selected camera is controllable is transmitted from said inquiry device.

18. An apparatus according to claim 14, wherein said display controller displays the camera operation interface on a screen.

19. An apparatus according to claim 18, wherein said display controller device displays an image display portion on the screen configured to display images input from a plurality of cameras.

20. An apparatus according to claim 19, further comprising an inquiry device that transmits an inquiry signal for inquiring of an image transmission terminal apparatus whether or not the selected camera of the plurality of cameras is controllable.

21. An apparatus according to claim 20, wherein said inquiry device transmits the inquiry signal for inquiring of the image transmission terminal apparatus whether or not the selected camera is controllable by designating an image input from the selected camera of the images input from the plurality of cameras displayed on the image display portion.

22. An apparatus according to claim 18, wherein said display controller displays the camera operation interface on the screen in different colors according to whether the selected camera is controllable or not controllable.

23. An apparatus according to claim 18, wherein said display controller does not display the camera operation interface on the screen when said determination device determines that the selected camera is not controllable.

24. An apparatus according to claim 18, wherein said display controller does not display any operation buttons arranged on the camera operation interface on the screen when said determination means determines that the selected camera is not controllable.

25. An apparatus according to claim 18, further comprising a pointing device that allows an input operation on the screen.

26. An apparatus according to claim 16, wherein said image transmission terminal apparatus comprises:

a camera controller that controls the selected camera; and a transmission device that transmits a signal for responding to the inquiry signal regarding whether or not the selected camera is controllable.

27. A storage medium which stores a program, providing the processing functions of:

receiving information which indicates whether or not a selected camera is controllable from an image transmission terminal apparatus of a selected camera;

determining whether or not the selected camera is controllable, on the basis of the received information;

performing display control for displaying a camera operation interface that has functions to input a control command to control the selected camera; and changing a display state of the camera operation interface between a first display state for the selected camera corresponding to a determination that the selected camera is controllable and a second display state for the selected camera, the second display state being different from the first and corresponding to a determination that the selected camera is not controllable; and displaying an image received from the image transmission terminal apparatus.

28. A medium according to claim 27, wherein said storage medium comprises a program for providing the processing function of controlling to disable the camera control interface wherein the determination result indicates that the selected camera is uncontrollable.

29. A camera control method comprising the steps of:

receiving information which indicates whether or not a selected camera is controllable from an image transmission apparatus of the selected camera;

determining whether or not the selected camera is controllable, on the basis of the received information;

displaying a camera operation interface that has functions to input a control command to control the selected camera;

changing a display state of the camera operation interface between a first display state for the selected camera corresponding to a determination that the selected camera is controllable and a second display state for the selected camera, the second display state being different from the first and corresponding to a determination that the selected camera is not controllable; and displaying an image received from the image transmission terminal apparatus.

30. A method according to claim 29, further comprising the control step of disabling an operation of the camera operation interface when it is determined in the determination step that the selected camera is controllable.

31. An apparatus according to claim 14, wherein the received information is information as to whether or not the selected camera is mounted on a tripod.

32. An apparatus according to claim 14, wherein the received information is information as to whether or not there is something wrong with a tripod on which the selected camera is mounted.

33. An apparatus according to claim 14, wherein the camera operation interface can select at least one of pan, tilting and zoom of the selected camera.

34. A medium according to claim 27, wherein the camera operation interface can select at least one of pan, tilting and zoom of the selected camera.

35. A method according to claim 29, wherein the camera operation interface can select at least one of pan, tilting and zoom of the selected camera.

36. A camera control system according to claim 1, wherein in the second display state, the control command cannot be input.

37. An image reception terminal apparatus according to claim 14, wherein in the second display state, the control command cannot be input.

38. A storage medium which stores a program according to claim 27, wherein in the second display state, the control command cannot be in input.

39. A camera control method according to claim 29, wherein in the second display state, the control command cannot be input.

* * * * *

UNITED STATES PATENT AND TRADEMARK OFFICE
CERTIFICATE OF CORRECTION

PATENT NO. : 6,911,999 B2  
APPLICATION NO. : 08/788829  
DATED : June 28, 2005  
INVENTOR(S) : Sasaki It is certified that error appears in the above-identified patent and that said Letters Patent is hereby corrected as shown below:

TITLE PAGE:
(57) ABSTRACT, line 2, "determined" should read -- determines --.

COLUMN 4:
Line 4, "sued" should read -- used --.

COLUMN 6:
Line 57, "store" should read -- stored --.

COLUMN 12:
Line 55, "in" should be deleted.

Signed and Sealed this

Twenty-second Day of August, 2006

JON W. DUDAS  
*Director of the United States Patent and Trademark Office*